US009369889B2

(12) United States Patent
Siquenique

(10) Patent No.: US 9,369,889 B2
(45) Date of Patent: Jun. 14, 2016

(54) METHOD FOR PROVISIONING OF A SIM CARD

(71) Applicant: VODAFONE HOLDING GMBH, Duesseldorf (DE)

(72) Inventor: Joao Siquenique, Duesseldorf (DE)

(73) Assignee: VODAFONE HOLDING GMBH, Duesseldorf (DE)

( * ) Notice: Subject to any disclaimer, the term of this patent is extended or adjusted under 35 U.S.C. 154(b) by 84 days.

(21) Appl. No.: 14/188,872

(22) Filed: Feb. 25, 2014

(65) Prior Publication Data

US 2014/0243045 A1 Aug. 28, 2014

(30) Foreign Application Priority Data

Feb. 25, 2013 (EP) ..................................... 13000933

(51) Int. Cl.
| | |
|---|---|
| *H04M 1/00* | (2006.01) |
| *H04B 1/38* | (2015.01) |
| *H04W 24/02* | (2009.01) |
| *H04M 1/725* | (2006.01) |
| *H04W 4/00* | (2009.01) |
| *H04W 8/20* | (2009.01) |
| *H04B 1/3816* | (2015.01) |
| *H04W 8/26* | (2009.01) |

(52) U.S. Cl.
CPC ............. *H04W 24/02* (2013.01); *H04B 1/3816* (2013.01); *H04M 1/72561* (2013.01); *H04W 4/001* (2013.01); *H04W 4/003* (2013.01); *H04W 8/205* (2013.01); *H04W 8/265* (2013.01)

(58) Field of Classification Search
CPC ..... H04W 24/02; H04W 4/003; H04W 8/205; H04W 4/001; H04W 8/265; H04B 1/3816; H04M 1/72561
USPC .......................................................... 455/558
See application file for complete search history.

(56) References Cited

U.S. PATENT DOCUMENTS

| | | |
|---|---|---|
| 2005/0141438 A1 | 6/2005 | Quetglas et al. |
| 2007/0076760 A1* | 4/2007 | Wennberg et al. ............ 370/477 |

(Continued)

*Primary Examiner* — Yuwen Pan
*Assistant Examiner* — Fatuma Sherif

(74) *Attorney, Agent, or Firm* — Grossman, Tucker, Perreault & Pfleger, PLLC

(57) ABSTRACT

The present invention relates to a method for provisioning of a SIM card by a backend platform of a mobile network, wherein the SIM card comprises an application for activating mobile network service functionalities of a mobile terminal using the SIM card, the application is started automatically when the mobile terminal is switched on and starts a timer of at least up to 10 seconds when the presently used combination of the SIM card and the mobile terminal was not used before, during the timer a browser application on the SIM card is started, which displays data stored in a memory of the SIM card on a display of the mobile terminal and initiates a data connection to the backend platform by using an URL stored in a memory of the SIM card, after the timer has expired the browser application displays data of the URL received from the backend platform as a menu on the display of the mobile terminal, whereby the menu comprises information selectable by a user of the mobile terminal for creating a request for activating mobile network service functionalities of the mobile terminal using the SIM card, and sends a request for activating mobile network service functionalities of the mobile terminal using the SIM card to the backend platform, whereby the request is created corresponding to mobile network service functionalities selected by the user from the menu.

Furthermore the present invention relates to a SIM card for usage with a mobile terminal operate-able in a mobile network, which is characterized in that the SIM card comprises an application for activating mobile network service functionalities of a mobile terminal using the SIM card, the application is started automatically when the mobile terminal is switched on and starts a timer of at least up to 10 seconds when the presently used combination of the SIM card and the mobile terminal was not used before, during the timer a browser application on the SIM card is started, which displays data stored in a memory of the SIM card on a display of the mobile terminal and initiates a data connection to the backend platform by using an URL stored in a memory of the SIM card, after the timer has expired the browser application displays data of the URL received from a backend platform as a menu on the display of the mobile terminal, whereby the menu comprises information selectable by a user of the mobile terminal for creating a request for activating mobile network service functionalities of the mobile terminal using the SIM card, and sends a request for activating mobile network service functionalities of the mobile terminal using the SIM card to the backend platform, whereby the request is created corresponding to mobile network service functionalities selected by the user from the menu.

18 Claims, 1 Drawing Sheet

(56) References Cited

U.S. PATENT DOCUMENTS

2007/0186107 A1* 8/2007 Sonetaka ............... G06F 21/43
 713/170
2008/0009318 A1 1/2008 Evans
2011/0086670 A1* 4/2011 Shin .............................. 455/558
2011/0159843 A1* 6/2011 Heath et al. ................... 455/558
2012/0036282 A1 2/2012 Chen et al.

* cited by examiner

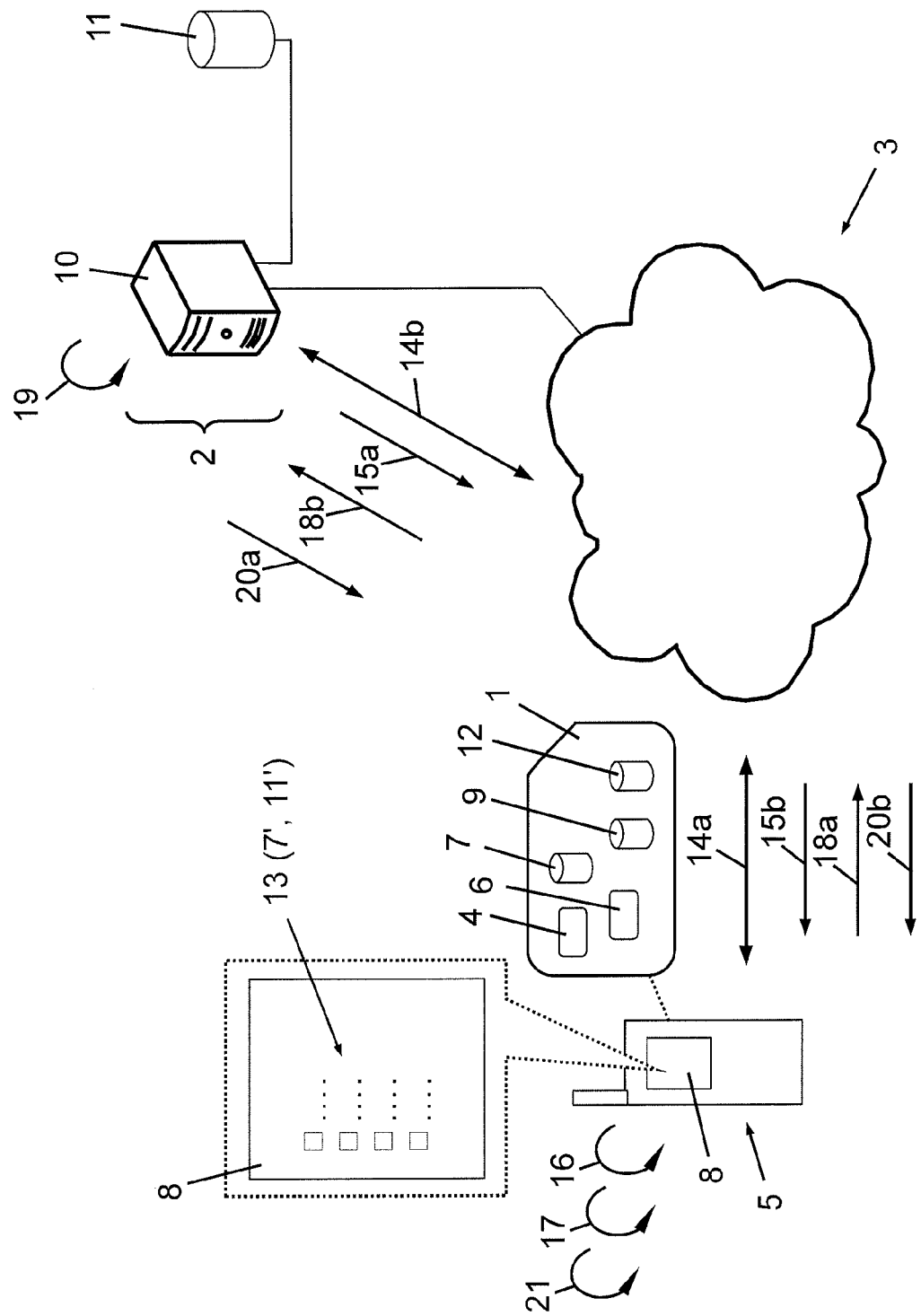

METHOD FOR PROVISIONING OF A SIM CARD

CROSS REFERENCE TO RELATED APPLICATIONS

This application claims priority to European Patent Application No. 13 000 933.5 filed on Feb. 25, 2013, the disclosure of which is incorporated by reference herein in its entirety.

FIELD OF THE INVENTION

The present invention relates to a method for provisioning of a SIM card (SIM: Subscriber Identification Module) by a backend platform of a mobile network.

Furthermore, the invention relates to a SIM card for usage with a mobile terminal operate-able in a mobile network.

BACKGROUND

For using mobile network service functionalities of a mobile network with a mobile terminal, especially a mobile network according to a GSM-, GPRS-, UMTS- and/or LTE-standard, customers or subscribers of the mobile network are provided with a SIM card by the mobile network operator (MNO: Mobile Network Operator). The SIM is an integrated circuit that securely stores the international mobile subscriber identity (IMSI) and the related key used to identify and authenticate subscribers on mobile terminals. The SIM is embedded into a removable SIM card, which can be transferred between different mobile terminals. For usage of mobile network service functionalities the SIM card has to be inserted into a mobile terminal.

To set up mobile network service functionalities for a subscriber, such as SMS, MMS, GPRS, WAP, Instant Messaging, E-Mail or the like services, a provisioning of the SIM card respectively provisioning of the mobile terminal using the SIM card is necessary. Such settings differ from MNO to MNO, from service to service and/or mobile terminal to mobile terminal and are typically send to the subscribers SIM card by the MNO via the mobile network, usually by means of a backend platform of the mobile network, for example with an OTA-application of an OTA-platform (OTA: Over The Air). Such provisioning is done, when the SIM card is used for the first time or is requested by the subscriber, for example, when the subscriber has got a new mobile terminal or has changed the MNO.

Since mobile network services are widely spread, subscribers of mobile network services often have more than one mobile terminal for usage of mobile network services, for example an older mobile terminal and a new mobile terminal. Subscribers often keep an older mobile terminal as a backup terminal for cases the new mobile terminal is defect and has to be repaired or the like cases. If the subscriber has or wants to use another mobile terminal for mobile network services it might be necessary to set up the mobile network service functionalities, in particular when the mobile terminal was provided to the subscriber by an MNO who differs from the MNO providing the SIM card, which is often the case by so called subsidized mobile terminals.

From the point of the subscriber and from the point of the MNO providing a SIM card to the subscriber it is desirable, that the provisioning of settings is doable in an easy and less cumbersome way, especially to reduce resources and/or manpower requirements on the part of the MNO, for example for a support line or help line. Furthermore it is important, that the provisioning service is done in a way, that the subscriber got a good impression of the MNO providing the SIM card, even when the subscriber uses a mobile terminal which was provided or subsidized by another MNO.

SUMMARY

To achieve this, the present invention suggests a method for provisioning of a SIM card by a backend platform of a mobile network, wherein the SIM card comprises an application for activating mobile network service functionalities of a mobile terminal using the SIM card, the application is started automatically when the mobile terminal is switched on and starts a timer of at least up to 10 seconds when the presently used combination of the SIM card and the mobile terminal was not used before, during the timer a browser application on the SIM card is started, which displays data stored in a memory of the SIM card on a display of the mobile terminal and initiates a data connection to the backend platform by using an URL stored in a memory of the SIM card, after the timer has expired the browser application displays data of the URL received from the backend platform as a menu on the display of the mobile terminal, whereby the menu comprises information selectable by a user of the mobile terminal for creating a request for activating mobile network service functionalities of the mobile terminal using the SIM card, and sends a request for activating mobile network service functionalities of the mobile terminal using the SIM card to the backend platform, whereby the request is created corresponding to mobile network service functionalities selected by the user from the menu.

The present invention is based on the knowledge, that the subscriber's impression of a good and fast provisioning service is realizable, when information of the MNO providing the SIM card, preferably information with regard to mobile network service functionalities, is/are displayed on the display of the mobile terminal directly when the mobile terminal is started, while initiating a data connection to a backend platform of the mobile network in the background, especially since the subscriber then is directly willing and able to set up mobile network service functionalities offered by the MNO. With that, the subscriber will further get the impression of a very fast provisioning service, since it seems that the provisioning starts directly when the mobile terminal is switched on. Furthermore the subscribers loyalty to the MNO is increased.

Advantageously the backend platform replies on the received request with data for activating of functionalities of the mobile terminal using the SIM card for the use of selectable mobile network service functionalities, whereby the data is determined on part of the backend platform, is sent from the backend platform to the mobile terminal respectively the SIM card via the data connection and is used on part of the mobile terminal respectively on part I the SIM card for activating of selected functionalities of the mobile terminal using the SIM card for the use respectively access of mobile network service functionalities.

A preferred embodiment of the present invention is characterized in that the application detects the IMEI of the mobile terminal from the mobile terminal and uses the detected IMEI to determine whether the presently used combination of the SIM card and the mobile terminal was used before. When the combination of the SIM card and the mobile terminal was used before a provisioning is usually not necessary. The determination advantageously comprises a matching if the detected IMEI (IMEI: International Mobile Equipment Identity) is identical to at least one IMEI stored in a memory of the SIM card. The SIM card is preferably adapted to store IMEIs of at least up to five mobile terminals which have been used with the SIM card before.

Another embodiment of the present invention is advantageously characterized in that said memory of the SIM card for storing an URL of the backend platform is adapted to store at least up to five URLs.

A further preferred embodiment of the invention is characterized in that said memory of the SIM card for storing data to be displayed by the browser application during the timer is adapted to store data of at least up to 5 kByte.

In another preferred embodiment of the invention the data, which is stored in the memory of the SIM card and which is to be displayed by the browser application during the timer, provides a menu on the display of the mobile terminal, whereby the menu comprises information selectable by the user of the mobile terminal. Advantageously the information selectable by a user of the mobile terminal is for creating a request for activating mobile network service functionalities of the mobile terminal using the SIM card.

A further embodiment of the present invention is characterized in that the detected IMEI of the mobile terminal is stored in a memory of the SIM card. Preferably the detected IMEI is stored, when the combination of the SIM card and the mobile terminal was not used before.

Object of the present invention is further a SIM card for usage with a mobile terminal operate-able in a mobile network, which is characterized in that the SIM card comprises an application for activating mobile network service functionalities of a mobile terminal using the SIM card, the application is started automatically when the mobile terminal is switched on and starts a timer of at least up to 10 seconds when the presently used combination of the SIM card and the mobile terminal was not used before, during the timer a browser application on the SIM card is started, which displays data stored in a memory of the SIM card on a display of the mobile terminal and initiates a data connection to a backend platform by using an URL stored in a memory of the SIM card, after the timer has expired the browser application displays data of the URL received from the backend platform as a menu on the display of the mobile terminal, whereby the menu comprises information selectable by a user of the mobile terminal for creating a request for activating mobile network service functionalities of the mobile terminal using the SIM card, and sends a request for activating mobile network service functionalities of the mobile terminal using the SIM card to the backend platform, whereby the request is created corresponding to mobile network service functionalities selected by the user from the menu.

A preferred embodiment of the present invention suggests that the application detects the IMEI of the mobile terminal from the mobile terminal and uses the detected IMEI to determine whether the presently used combination of the SIM card and the mobile terminal was used before. It is preferred that the determination comprises a matching if the detected IMEI is identical to at least one IMEI stored in a memory of the SIM card. The SIM card is preferably adapted to store IMEIs of at least up to five mobile terminals which have been used with the SIM card before.

A further embodiment of the invention is advantageously characterized in that said memory of the SIM card for storing an URL of the backend platform is adapted to store at least up to five URLs.

Another embodiment of the present invention is advantageously characterized in that said memory of the SIM card for storing data to be displayed by the browser application during the timer is adapted to store information of at least up to 5 kByte.

Another embodiment of the invention advantageously is characterized in that the data, which is stored in the memory of the SIM card and which is to be displayed by the browser application during the timer, provides a menu on the display of the mobile terminal, whereby the menu comprises information selectable by the user of the mobile terminal. The information selectable by a user of the mobile terminal is advantageously for creating a request for activating mobile network service functionalities of the mobile terminal using the SIM card.

A preferred embodiment of the present invention suggests that the detected IMEI of the mobile terminal is store-able in a memory of the SIM card. The detected IMEI is advantageously stored, when the combination of the SIM card and the mobile terminal was not used before.

Other details, characteristics and advantages of the present invention will be explained in detail in the following by means of the exemplary embodiments represented in the figure of the drawing. Herein:

BRIEF DESCRIPTION OF THE DRAWING

FIG. 1 is a schematic diagram showing an exemplary embodiment according to the present invention.

DETAILED DESCRIPTION

FIG. 1 shows a mobile terminal 5 operate-able in a mobile network 3, presently according to a GSM-, GPRS-, UMTS- and/or LTE-standard. For usage of mobile network service functionalities a SIM card 1 has to be inserted into a mobile terminal 5.

The SIM card 1 comprises an application 4 for activating mobile network service functionalities of the mobile terminal 5 using the SIM card 1. The application 4 is started automatically when the mobile terminal 5 is switched on.

The application 4 determines whether the presently used combination of the SIM card 1 and the mobile terminal 5 was used before. The determination is done, by detecting the IMEI of the mobile terminal 5 from a memory of the mobile terminal 5 and matching if the detected IMEI is identical to at least one IMEI stored in a memory 12 of the SIM card 1. The IMEI stored in the memory 12 of the SIM card 1 was stored previously.

The application 4 starts a timer of at least up to 10 seconds when the presently used combination of the SIM card 1 and the mobile terminal 5 was not used before. That is the case, when the result of the matching is negative.

During the timer the application 4 starts a browser application 6 and initiates a data connection 14a, 14b to a backend platform 2 of the mobile network 3. The starting of the browser application 6 and the initiating of the data connection 14a, 14b is done simultaneously by the application 4.

The browser application 6 is stored on the SIM card 1 and displays data 7' stored in a memory 7 of the SIM card 1 on a display 8 of the mobile terminal 5. The data stored in the memory 7 of the SIM card 1, which is displayed by the browser application 6 during the timer, provides a menu 13 on the display 8 of the mobile terminal 5. The menu 13 comprises information for provisioning of the SIM card 1, which information is selectable by the user of the mobile terminal 5.

The data connection 14a, 14b to the backend platform 2 is initiated by using an URL of the backend platform 2. The URL is stored in a memory 9 of the SIM card 1. The backend platform 2 is adapted for executing a provisioning of SIM cards for activating mobile network service functionalities of mobile terminals using a SIM card. In FIG. 1 the backend platform symbolically comprises at least one server 10 with at least one database 11. The server 10 of the backend platform 11 is reachable via the mobile network 3 by using an URL.

After the timer has expired the browser application 6 displays data 11' received from the backend platform 2 via the established data connection 14a, 14b. The received data 11' are stored in the database 11 of the backend platform and are dedicated to the URL of the backend platform 2 respectively the server 10 of the backend platform 2. In FIG. 1 the receiving of the data 11' from the backend platform 2 via the established data connection 14a, 14b is symbolically shown by the arrows marked with reference numbers 15a and 15b. The received data 11' are displayed (in FIG. 1 the displaying of data 11' is symbolically shown by the arrow marked with reference numbers 16) by the browser application 6 as a menu 13 on the display 8 of the mobile terminal 5, whereby the menu 13 comprises information selectable by a user of the mobile terminal 5 for creating a request for activating mobile network service functionalities of the mobile terminal 5 using the SIM card 1.

According to the selection of the user of the mobile terminal 5 the application 4 creates a request for activating mobile network service functionalities of the mobile terminal 5 using the SIM card 1 (in FIG. 1 the creating of the request is symbolically shown by the arrow marked with reference numbers 17). The created request for activating mobile network service functionalities is send to the backend platform 2 via the data connection 14a, 14b. In FIG. 1 the sending of the request is symbolically shown by the arrows marked with reference numbers 18a and 18b.

On the received request for activating mobile network service functionalities to the backend platform 2 determines data for provisioning the SIM card 1 used by the mobile terminal 5. In FIG. 1 the determination of the provisioning data is symbolically shown by the arrow marked with reference number 19. The determined provisioning data is send via the data connection 14a, 14b from the backend platform 2 to the mobile terminal 5 using the SIM card 1 (in FIG. 1 the sending of the provisioning data is symbolically shown by the arrows marked with reference numbers 20a and 20b). The provisioning data received by the mobile terminal 5 using the SIM card 1 are then automatically installed respectively set up by the application 4 of the SIM card 1 for activating the mobile network service functionalities selected by the user of the mobile terminal 5 (in FIG. 1 the installation respectively set up of the provisioning data is symbolically shown by the arrow marked with reference number 21).

The exemplary embodiments of the invention represented in the figures of the drawings and described in connection with these one only serve for explaining the invention and are not limiting for this one.

LIST OF REFERENCE NUMERALS

1 SIM card
2 backend platform (mobile network (3))
3 mobile network
4 application (SIM card (1))
5 mobile terminal
6 browser application (SIM card (1))
7 memory (SIM card (1))
7' data (memory (7))
8 display (mobile terminal (5))
9 memory for URL (SIM card (1))
10 server (backend platform (2))
11 database (backend platform (2)
11' data (database (11))
12 memory for IMEI (SIM card (1))
13 menu
14a data connection
14b data connection
15a send data (11')
15b send data (11')
16 display data (11')
17 create request
18a send request
18b send request
19 determine provisioning data
20a send provisioning data
20b send provisioning data
21 set up provisioning data

The invention claimed is:

1. A method for provisioning of a Subscriber Identification Module (SIM) card by a backend platform of a mobile network, wherein the SIM card comprises an application for activating mobile network service functionalities of a mobile terminal using the SIM card, the method comprising:
   starting the application automatically when the mobile terminal is switched on and starting a timer of at least up to 10 seconds when the presently used combination of the SIM card and the mobile terminal was not used before,
   during the timer:
      starting a browser application on the SIM card;
      displaying data stored in a memory of the SIM card on a display of the mobile terminal; and
      initiating a data connection to the backend platform by using a uniform resource locator (URL) stored in a memory of the SIM card;
   after the timer has expired:
      displaying data of the URL received from the backend platform as a menu on the display of the mobile terminal by the browser application, wherein the menu comprises information selectable by a user of the mobile terminal for creating a request for activating mobile network service functionalities of the mobile terminal using the SIM card; and
      sending a request for activating mobile network service functionalities of the mobile terminal using the SIM card to the backend platform, wherein the request is created corresponding to mobile network service functionalities selected by the user from the menu.

2. The method according to claim 1, wherein the application detects the International Mobile Equipment Identity (IMEI) of the mobile terminal from the mobile terminal and uses the detected IMEI to determine whether the presently used combination of the SIM card and the mobile terminal was used before.

3. The method according to claim 2, wherein the determination comprises a matching if the detected IMEI is identical to at least one IMEI stored in a memory of the SIM card.

4. The method according to claim 1, wherein said memory of the SIM card for storing an URL of the backend platform is adapted to store at least up to five URLs.

5. The method according to claim 1, wherein said memory of the SIM card for storing data to be displayed by the browser application during the timer is adapted to store data of at least up to 5 kByte.

6. The method according to claim 1, wherein the data, which is stored in the memory of the SIM card and which is to be displayed by the browser application during the timer, provides a menu on the display of the mobile terminal, whereby the menu comprises information selectable by the user of the mobile terminal.

7. The method according to claim 6, wherein the information selectable by a user of the mobile terminal is for creating a request for activating mobile network service functionalities of the mobile terminal using the SIM card.

8. The method according to claim 2, wherein the detected IMEI of the mobile terminal is stored in a memory of the SIM card.

9. The method according to claim 8, wherein the detected IMEI is stored when the combination of the SIM card and the mobile terminal was not used before.

10. A Subscriber Identification Module (SIM) card for usage with a mobile terminal operable in a mobile network, the SIM card comprising:
   a memory including an application for activating mobile network service functionalities of a mobile terminal using the SIM card,
   wherein the application is adapted to be started automatically when the mobile terminal is switched on and is adapted to start a timer of at least up to 10 seconds when the presently used combination of the SIM card and the mobile terminal was not used before,
   and wherein during the timer a browser application on the SIM card is adapted to be started, the browser application being adapted to display data stored in a memory of the SIM card on a display of the mobile terminal and is adapted to initiate a data connection to a backend platform by using a uniform resource locator (URL) stored in a memory of the SIM card,
   and wherein after the timer has expired the browser application is adapted to:
      display data of the URL received from the backend platform as a menu on the display of the mobile terminal, wherein the menu comprises information selectable by a user of the mobile terminal for creating a request for activating mobile network service functionalities of the mobile terminal using the SIM card, and
      send a request for activating mobile network service functionalities of the mobile terminal using the SIM card to the backend platform, wherein the request is created corresponding to mobile network service functionalities selected by the user from the menu.

11. The SIM card according to claim 10, wherein the application is adapted to detect the International Mobile Equipment Identity (IMEI) of the mobile terminal from the mobile terminal and to use the detected IMEI to determine whether the presently used combination of the SIM card and the mobile terminal was used before.

12. The SIM card according to claim 11, wherein the determination comprises a matching if the detected IMEI is identical to at least one IMEI stored in a memory of the SIM card.

13. The SIM card according to claim 10, wherein said memory of the SIM card for storing an URL of the backend platform is adapted to store at least up to five URLs.

14. The SIM card according to claim 10, wherein said memory of the SIM card for storing data to be displayed by the browser application during the timer is adapted to store information of at least up to 5 kByte.

15. The SIM card according to claim 10, wherein the data, which is stored in the memory of the SIM card and which is to be displayed by the browser application during the timer is adapted to provide a menu on the display of the mobile terminal, whereby the menu comprises information selectable by the user of the mobile terminal.

16. The SIM card according to claim 15, wherein the information selectable by a user of the mobile terminal is for creating a request for activating mobile network service functionalities of the mobile terminal using the SIM card.

17. The SIM card according to claim 11, wherein the detected IMEI of the mobile terminal is store-able in a memory of the SIM card.

18. The SIM card according to claim 17, wherein the detected IMEI is stored when the combination of the SIM card and the mobile terminal was not used before.

* * * * *